T. Milner,
Saw Guide.
N° 78,752. Patented June 9, 1868.

Witnesses:
Theo Pusche
W. Prewm

Inventor:
T. Milner
Per Munn & Co
Attorneys

United States Patent Office.

THOMAS MILNER, OF HOUSTON, TEXAS.

Letters Patent No. 78,752, dated June 9, 1868.

IMPROVEMENT IN CIRCULAR-SAW GUIDES.

*The Schedule referred to in these Letters Patent and making part of the same.*

TO ALL WHOM IT MAY CONCERN:

Be it known that I, THOMAS MILNER, of Houston, in the county of Harris, and State of Texas, have invented new and improved Saw-Guides; and I do hereby declare that the following is a full, clear, and exact description thereof, which will enable others skilled in the art to make and use the same, reference being had to the accompanying drawings, forming part of this specification.

Similar letters of reference indicate corresponding parts.

Figure 1:
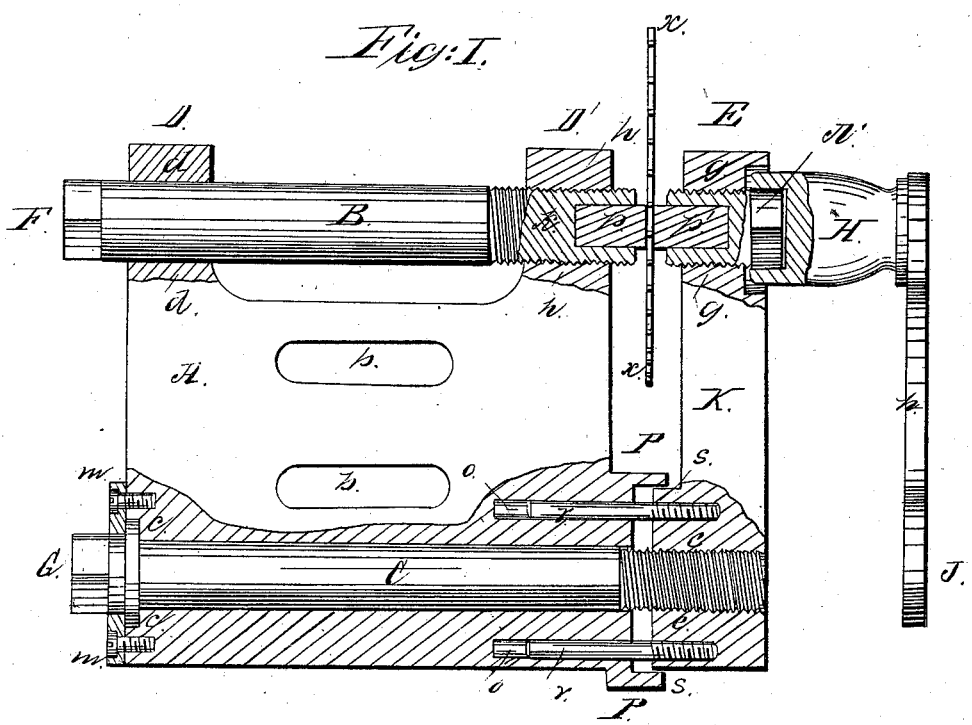
Figure 1 is a top view of the guides with removed sections.
Figure 2:
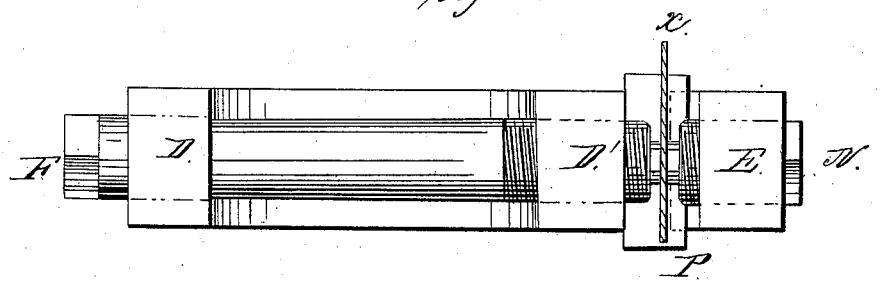
Figure 2 is a view of the front end of the guides.

The nature of my improvements consists in the arrangement of the parts constituting the parts of a guide for circular saws, so that they can be operated with facility and accuracy, together with devices for improving and perfecting the whole, as will be hereinafter more fully set forth.

A is the main plate, having slots $b\ b$ for bolting the same to the saw-frame.

The projections D D' are provided with bearings $d$ and $h$, shown by the removal of a portion of the said projections.

The guide-bolt B rests in these bearings. The part $k$ of the guide-bolt has a thread cut on it, which fits and works in a corresponding thread cut in the bearing $h$ on the projection D', so that, by turning it, the bolt B is adjusted in or out.

The end of the said guide-bolt has a hole to receive the wooden plug $p$. The other end has a square head, F.

The bolt C, which is shown by a removed section of the plate A, is somewhat longer than the bolt B, and has a square head, G, on one end, and a thread on the other.

This bolt passes transversely through the plate A, midway between its upper and lower surfaces. Its office is to separate the jaw K from the main plate A or to bring the same together, as occasion may require.

For this purpose the jaw K has a hollow screw, $e$, fitting the thread on the bolt $c$. The jaw K has also small guide-rods $r\ r$ working in the holes $o\ o$, to steady the same.

This jaw has a square shoulder, $s$, which fits with easy contact into a square box on the main plate, this box being formed by a flange, P, cast on the said plate; and the object of thus fitting the plate and jaw with this device is to exclude the saw-dust from the screw within.

The opposite end of the bolt C is provided with a collar, $c$, fitting into a corresponding recess in the plate A, and a cap, $m$, is bolted on to said plate over this collar, thus enclosing it in a chamber, whereby the bolt C is prevented from any but a rotary movement.

At the end, E, of the jaw K is a hollow screw, on the same line as the guide-bolt B. Into this hollow screw is fitted an outside guide-bolt, N, having a square head, and a hole for the reception of a wooden plug, $p'$, similar to that in the inner guide-bolt B.

The head N is partially countersunk, and is fitted by a box-wrench, H, as shown in the drawing. This box-wrench also fits the head, F, of the guide-bolt B, whereby both can be set as desired by means of their threads and corresponding hollow screws in the jaws.

The guides are bolted on to the saw-frame through the slots $b\ b$, and set so as to bring the guide-bolts, one on each side of the saw, near the perimeter of the same. Then the guide-bolt B is set, by turning it, till the plug $p$ comes in contact with the saw, and the outside guide-bolt N is set, by turning the bolt C, which operates the jaw K, as shown previously, and consequently the guide-bolt N; for this latter is not set by means of the wrench on its head, as shown in the drawing, only to get it at first in a proper position, or to set it up afterward, if the plug $p'$ is worn away, the general and common adjustment of the two guides being made through the bolts B and C, from the same side of the plate A, and within the saw-frame, as they will thus be when the plate A is bolted in its place.

Instead of employing a wrench to adjust the bolts, circular milled heads can be substituted for the square heads, and the wrench thus dispensed with.

The advantages of my improved saw-guides are as follows:

First. Being operated by screws, the guide-bolts can be nicely adjusted while the saw is in motion, thereby saving time and obtaining a great degree of accuracy in sawing.

Second. The point of operating the bolts being remote from the saw, there is less danger of accident to the attendant, who can set the guides, while the saw is in motion, with safety.

Third. Both sides of the plate being alike, it can be used on right or left-hand saw-mills.

Fourth. The outside guide-bolt being chambered into the jaw, it is out of the way of the carriage.

The jaw and the main plate are of cast metal, and are durable, and not likely to get out of adjustment or repair.

There is a square wrench, J, in the handle, n, of the wrench H, which fits the head, G, on the bolt C.

I claim as new, and desire to secure by Letters Patent—

1. The arrangement of the bolt C within the plate A, the rods r r, working in the holes o o, acting in combination to operate the movable jaw K, as and for the purpose specified.

2. The flange P and shoulder s, constructed and arranged to operate substantially as and for the purposes shown and described.

THOS. MILNER.

Witnesses:
    J. RIORDAN,
    J. E. DOWLING,
    JOHN JOHNSTON.